United States Patent
Velusamy (10) Patent No.: US 9,929,943 B1
(45) Date of Patent: Mar. 27, 2018

(54) MANAGEMENT OF BEARER CONNECTIONS BASED ON POLICY COMMUNICATION FAILURE

(71) Applicant: Sprint Spectrum L.P., Overland Park, KS (US)

(72) Inventor: Saravana Velusamy, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 480 days.

(21) Appl. No.: 14/080,028

(22) Filed: Nov. 14, 2013

(51) Int. Cl.
*H04L 12/703* (2013.01)

(52) U.S. Cl.
CPC .................................. *H04L 45/28* (2013.01)

(58) Field of Classification Search
CPC ......... H04L 45/00; H04L 45/02; H04L 45/28; H04W 76/00; H04W 76/02; H04W 76/028; H04W 76/04; H04W 76/06
See application file for complete search history.

(56) References Cited

U.S. PATENT DOCUMENTS

| | | | |
|---|---|---|---|
| 2009/0017826 A1 | 1/2009 | Shaheen | |
| 2010/0040047 A1* | 2/2010 | Castellanos Zamora | H04L 65/1043 370/352 |
| 2013/0088956 A1* | 4/2013 | Zhou | H04W 4/08 370/230 |
| 2013/0142120 A1* | 6/2013 | Nishida | H04W 76/027 370/328 |
| 2013/0250750 A1* | 9/2013 | Nishida | H04W 76/00 370/216 |

FOREIGN PATENT DOCUMENTS

WO   WO2012/073937   6/2012

OTHER PUBLICATIONS

3GPP, "3rd Generation Partnership Project; Technical Specification Group Services and system Aspects; Architecture enhancements for non-3GPP accesses (Release 10)," 3GPP TS 23.402, V10.4.0, (Jun. 2011).
Office Action from U.S. Appl. No. 13/780,958, dated Mar. 2, 2015.
U.S. Appl. No. 13/780,958, filed Feb. 28, 2013.
Notice of Allowance from U.S. Appl. No. 13/780,958, dated Jul. 30, 2015.

(Continued)

*Primary Examiner* — Feben M Haile (57) ABSTRACT

A method, apparatus, and system, in which a network detects a communication failure between a gateway and a policy server, and the network responsively causes at least one user equipment device (UE) having at least one bearer connection with that gateway to detach and reattach so as to facilitate set up of at least one new bearer connection between the UE and a different gateway. Optimally, the different gateway would not have a similar communication failure with the policy server, so that the at least one new bearer connection can be successfully set up between the UE and the different gateway, and one or more other bearers can be successfully set up between the UE and the different gateway.

17 Claims, 4 Drawing Sheets

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN access (Release 9)," 3GPP TS 23.401 V9.10.0, (Sep. 2011).
"IMS PDN connection deactivation while the UE in the idle state," SA WG2 Meeting #93, S2-123525, Oct. 11, 2012.
"IMS PDN connection while the UE is in the idle state," 3GPP TSG-SA2 Meeting #93, SA2-123526, version: 9.13.0, Oct. 11, 2012.
"IMS PDN connection while the UE is in the idle state," 3GPP TSG-SA2 Meeting #93, SA2-123527, version: 10.8.0, Oct. 11, 2012.
"IMS PDN connection while the UE is in the idle state," 3GPP TSG-SA2 Meeting #93, SA2-123528, version: 11.3.0, Oct. 11, 2012.
"Notifying UE on specific PDN disconnection while the UE is in the idle state," SA WG2 Meeting #93, S2-124089, version 11.3.0, Oct. 12, 2012.
"Notifying UE on specific PDN disconnection while the UE is in the idle state," SA WG2 Meeting #93, 52-124134, version: 10.8.0, Oct. 12, 2012.
"3rd Generation Partnership Project; Technical Specification Group Core Network and Terminals; Restoration procedures (Release 10)," 3GPP TS 23.007 V10.7.0 (Mar. 2012).

* cited by examiner

MANAGEMENT OF BEARER CONNECTIONS BASED ON POLICY COMMUNICATION FAILURE

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more gateways or similar components that provide connectivity with a packet-switched network so as to support various communication services. For instance, the infrastructure may include gateways that support general packet-data communications, such as general web browsing, file transfer, and the like, and/or real-time packet-based communications such as voice over Internet Protocol (VoIP) and streaming media for instance.

When a UE powers on or moves into the coverage of a base station, the UE engages in a process of registering or "attaching" with the network, which may trigger setup of various communication channels for the UE or reservation of various communication resources for the UE. For example, in a network operating according to the Long Term Evolution (LTE) protocol, a UE transmits an attach request message to the base station, which the base station forwards to a controller called a mobility management entity (MME). In response, the MME then invokes a process to authenticate and authorize the UE and retrieves a service profile of the UE from a subscription database and stores the profile for later reference during service invocation to determine one or more services that the UE is authorized to use. Further, the MME engages in signaling with the base station and with a serving gateway (SGW) to set up one or more bearer connections extending between the UE and a packet data network gateway (PGW), including for each bearer connection a radio bearer between the UE and the base station and an access bearer between the base station and the PGW. Further, the PGW may assign an Internet Protocol (IP) address for use by the UE, and to the extent the PGW supports communication with particular servers or systems, the PGW may register with those servers or systems on behalf of the UE.

Once these connections are established, the UE may then communicate bearer data (e.g., application layer communications such as web browsing and VoIP setup signaling) with various remote entities. In particular, as the base station serves the UE, bearer data may pass over a bearer connection from the UE to the base station to the PGW, and from the PGW over the packet-switched network to a remote entity. Likewise, communications destined to the UE from a remote entity may pass to the PGW serving the UE, then over a bearer connection from the PGW to the base station to the UE.

Furthermore, as the UE is served by the network, the UE may work with the network to establish additional bearers as needed. For example, if a UE subscribes to VoIP service, the UE may engage in VoIP call setup signaling over a VoIP signaling bearer that was established when the UE attached, and, responsive to signaling from the UE, the network may engage in a process similar to that discussed above, to establish a dedicated VoIP bearer for carrying VoIP bearer data (e.g., packetized voice) to and from the UE. Other examples are possible as well.

OVERVIEW

When a network works to set up a bearer between a UE and a gateway, such as a PGW, the gateway may engage in signaling with a policy server to authorize serving of the UE, such as to determine whether to establish the bearer and/or what policy rules the gateway should apply with respect to the bearer. In some systems, this communication between the gateway and the policy server may be a necessary step in the setup of the bearer between the UE and the gateway. Consequently, in such systems, if the gateway is unable to engage in this communication with the policy server, the network may be unable to set up the bearer between the UE and the gateway.

Unfortunately, this means that a communication failure between the gateway and the policy server may prevent a user from engaging in desired communication, which may create an undesirable user experience problem. By way of example, in a VoIP bearer scenario such as that discussed above, a UE may have an existing VoIP signaling bearer with a gateway, so that when a user seeks to initiate a VoIP call the UE may engage in VoIP call setup signaling with a VoIP call server or the like. However, when the network seeks to set up a dedicated VoIP bearer between the UE and the gateway for carrying the VoIP bearer data of that call, if the gateway cannot properly communicate with the policy server, the network may be unable to set up that dedicated VoIP bearer. Consequently, even though the VoIP call setup signaling may successfully work to set up the call, the UE may be unable to exchange voice traffic, and so the user may be unable to engage in the VoIP call.

Disclosed herein is a method, apparatus, and system to help overcome problems such as this. In accordance with the disclosure, a network will detect a communication failure between a gateway and a policy server, and the network will responsively cause at least one UE having at least one bearer connection with that gateway to detach and reattach so as to facilitate set up of at least one new bearer connection between the UE and a different gateway. Optimally, the different gateway would not have a similar communication failure with the policy server, so that the at least one new bearer connection can be successfully set up between the UE and the different gateway.

Accordingly, in one respect, disclosed is a method operable in a communication system that includes a gateway configured to provide connectivity between UEs and a transport network, in a scenario where at least one bearer connection is established respectively between each of one or more UEs and the gateway, and where the gateway is configured to communicate with a policy server to obtain authorization for serving of UEs. The method involves detecting failure of communication between the gateway and the policy server, and, in response to detecting that failure of communication, (i) causing release of the at least one bearer connection respectively between each of the one or more UEs and the gateway and (ii) causing establishment of at least one new bearer connection respectively between each of the one or more UEs and a different gateway that is configured to provide connectivity with the transport network.

In another respect, disclosed is a wireless communication system that includes a plurality of PGWs configured to provide UEs with connectivity to a packet-switched network, and an MME configured to manage setup and release of bearer connections between the UEs and the PGWs. Each of the PGWs in the plurality is configured to communicate with a policy server to obtain authorization for serving of UEs, and each PGW is further configured to detect communication failure between the PGW and the policy server and to report the communication failure to the MME. Further, the MME is configured to respond to a report of the communication failure from a given one of the PGWs at least in part by (i) identifying one or more UEs each having at least one bearer connection with the given PGW, (ii) causing the at least one bearer connection of each identified UE to be released and (iii) causing establishment for each identified UE of at least one new bearer connection with a different one of the PGWs.

In addition, in another respect, disclosed is an MME that includes a network communication interface, a processing unit, data storage, and program instructions stored in the data storage and executable by the processing unit to carry out various functions. The functions include determining that a first gateway that has at least one bearer connection with a user equipment device (UE) and that provides the UE with connectivity to a packet-switched network has experienced failure of communication with a policy server. Further, the functions include, responsive to that determination, signaling via the network communication interface to direct release of the at least one bearer connection and to cause establishment of at least one new bearer connection between the UE and a second gateway instead of the first gateway.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and corresponding apparatus and system will be described primarily in the context of VoIP related bearers as an example. It should be understood, however, that the principles described can apply in numerous other scenarios as well, with respect to other types of bearers and with many other variations. Further, the various arrangements and processes described herein are set forth for purposes of example only, and other arrangements and elements (e.g., machines, interfaces, functions, orders of elements and functions, etc.) can be added or used instead and some elements may be omitted altogether. Those skilled in the art will also appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As noted above, FIG. 1 is a simplified block diagram of an example network arrangement in which aspects of the present disclosure can be implemented. The arrangement of FIG. 1 includes by way of example one or more base stations (e.g., eNodeBs) 12 and multiple UEs 14 within coverage of the base station(s) 12. The base station(s) and UEs may be configured to communicate with each other over a radio frequency air interface 16 according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed.

Figure 1:
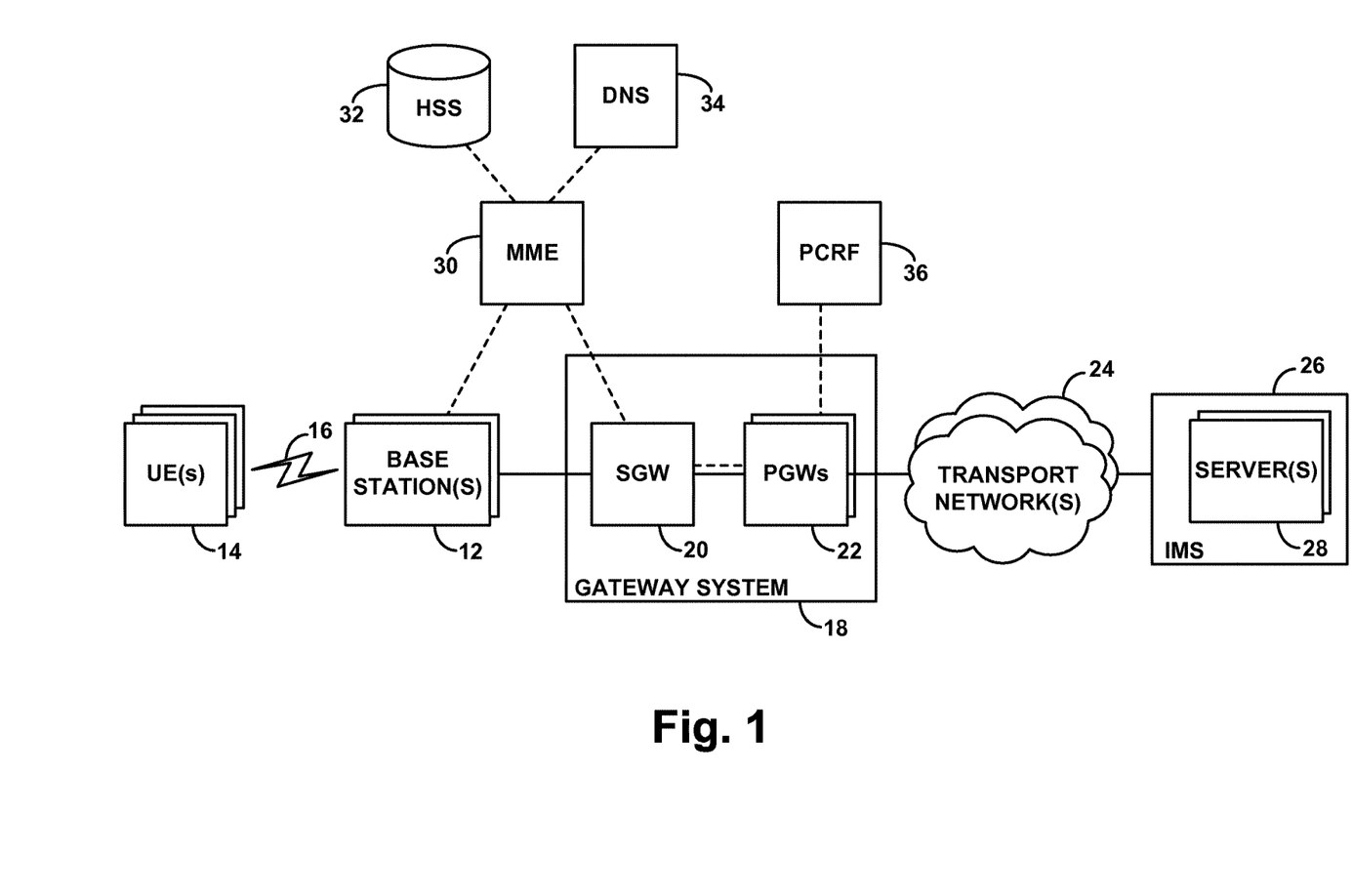
FIG. 1 is a simplified block diagram of a network arrangement in which aspects of the present disclosure can be implemented.

As further illustrated, the arrangement includes a gateway system 18 comprising a representative serving gateway (SGW) 20 and a plurality of packet gateways (PGWs) 22. The SGW 20 is configured to communicate with the base stations 12 and with the various PGWs 22. And the PGWs 22 are then arranged to provide connectivity with one or more transport networks 24 such as the public Internet and various private application service networks for instance. Shown sitting on the transport network(s) is then an Internet Multimedia System (IMS) 26 having one or more servers 28 arranged to support VoIP communication service.

In addition, the arrangement includes a representative MME 30, which functions as a controller and may be configured to carry out various functions described herein. The MME is configured to communicate with the base station(s) 12 and with the SGW 20. Further, the MME is configured to communicate with a Home Subscriber Server (HSS) 32, which may store account and service profiles for various UEs, and with a Dynamic Name System (DNS) server 28, which the MME may query at the time of bearer establishment to determine which PGW(s) may support particular types of communication service.

Further, the arrangement includes a representative policy server shown as a Policy Charging and Rules Function (PCRF) 36, with which the PGWs are configured to communicate in order to authorize serving of UEs, such as to determine whether to establish particular bearers with UEs and/or what service policy rules to apply with respect to those bearers.

In practice, many of these components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network. As such, dashed lines may represent logical signaling links for carrying signaling messages such as attach requests and responses, bearer setup messages, and policy control signaling messages, and solid lines may represent logical bearer links for carrying bearer data such as web browsing data and VoIP signaling and traffic for instance.

With the example arrangement shown, as each UE 14 enters into coverage of a base station 12, the UE may transmit an attach request over the air interface 16 to the base station, and the base station may forward the attach request to MME 30. The MME may then authenticate and authorize the UE and obtain from HSS 32 an indication of one or more application services to which the UE subscribes and may store an indication of those services in a context record for the UE, keyed to a UE identifier such as an International Mobile Subscriber Identity (IMSI) for instance. In turn, the MME may then engage in a process to set up one or more bearer connections for the UE, such as one default bearer connection for each service to which the UE subscribes. By way of example, if the UE subscribes to engage in general Internet communications and VoIP service, the MME may work to set up a default Internet bearer for use to carry general Internet traffic to and from the UE, and the MME may further work to set up a an IMS signaling bearer for use to carry VoIP control signaling (e.g., Session Initiation Protocol (SIP) signaling) that the UE may exchange with an IMS server 28.

To set up each such bearer for a UE, the MME may create a bearer identity (e.g., evolved packet system (EPS) bearer identity) and may query the DNS server 34 to obtain a list of one or more PGWs that would be appropriate for serving the UE with the service at issue (e.g., default Internet service or IMS service) and may select one such PGW. The MME may then send to the SGW 20 a create-session request message specifying the bearer identity, the service type, and the selected PGW. In response, the SGW may then create an entry for the UE in a bearer table that the SGW maintains, designating the bearer identity and an address or other identifier of the serving base station, and may further send to the specified PGW a create-session request, requesting establishment of the bearer for the UE.

Upon receipt of the create-session request from the SGW, the PGW may then query the PCRF 36 to obtain information or directives regarding various policy rules to be applied for the UE, for the service type at issue. By way of example, these rules may include an indication of whether or not the PGW should grant the create-session request for the UE, and indications of various restrictions or allowances, such as access control rules, to apply when serving the UE. Assuming the requested bearer is allowed, the PGW may then assign an IP address for the UE and create an entry in a bearer table that the PGW maintains. The PGW may then send a create-session response to SGW, and the SGW may send a create-session response to the MME. The MME may then responsively send to the base station an initial context setup request with an attach-accept message, providing the bearer identity (and perhaps an address or identity of the SGW), in response to which the base station may then allocate a radio bearer for UE communication of bearer data over the air interface 16.

Through this process, each such bearer connection is thus defined as a connection extending through numerous virtual tunnels between the base station 12 and the gateway system 18 and particularly extending between the base station 12 and the SGW 20 and between the SGW 20 and the selected PGW 22. In particular, the base station, SGW, and PGW may each store context data specifying the assigned bearer identity and applicable addresses or identities of other network entities with which to communicate data for that bearer.

In general, upon establishment of a bearer for a UE, the UE may operate in a Radio Resource Control (RRC) "Connected" mode, in which the UE may engage in active bearer communication, with the base station assigning air interface resources on which to carry bearer traffic to and from the UE. After a period of no such communication or in response to another trigger event, the UE may then transition to an RRC "Idle" mode in which the UE merely monitors the air interface for page messages and from which the UE may request transition back to the RRC Connected mode to engage in further bearer communication. Further, as a UE transitions between idle and connected modes, the UE's serving base station may engage in signaling with the MME to keep the MME apprised of the UE's connection state, so that the MME can manage paging and/or other functions.

In a representative arrangement, once the UE has an established IMS signaling bearer, the UE may engage in registration with the IMS, to facilitate later engaging in signaling with the IMS to set up VoIP calls. In practice, for instance, the UE may transmit a SIP REGISTER message via the IMS signaling bearer to the IMS and may then receive a SIP 200 OK message transmitted in response from the IMS. This registration process may serve various purposes, including providing the IMS with the UE's IP address to enable the IMS and the UE to then engage in further signaling with each other.

Thereafter, when a user of the UE then requests initiation of a voice call or the IMS seeks to connect a voice call to the UE, the UE and IMS may engage in SIP signaling with each other to set up a Real-time Transport Protocol (RTP) communication session through which to exchange VoIP traffic for the call. For instance, when a user of the UE requests initiation of a voice call, the UE may transmit a SIP INVITE message via the IMS signaling bearer to the IMS and may exchange further SIP signaling with the IMS to establish an RTP session for the call. And likewise, when the IMS seeks to connect a voice call to the UE, the IMS may transmit a SIP INVITE to the UE, which would pass to the UE via the IMS signaling bearer, and the UE and IMS may similarly exchange further SIP signaling to establish an RTP session for the call.

Further, to support communication of VoIP traffic between the UE and the IMS with sufficient quality of service, it is also typically necessary to establish for the UE a dedicated bearer for carrying VoIP traffic between the UE and the PGW. To facilitate this, the UE may engage in attach signaling with the MME, and the MME may responsively carry out a process like that discussed above to manage setup of a dedicated VoIP bearer for the UE, providing the UE with guaranteed bit rate for communicating VoIP traffic. In practice, the MME may arrange for setup of this dedicated VoIP bearer with the same PGW that serves the UE's IMS signaling bearer, as the IMS is arranged to communicate with the UE at the IP address assigned by that PGW.

To set up this dedicated VoIP bearer, the UE may transmit to the MME an attach request indicating VoIP as the type of communication desired. In response, the MME may then establish a bearer identity for the dedicated VoIP bearer and may send to the SGW a create-session request message specifying the bearer identity, the service type, and the PGW, and the SGW may in turn send a create-session request to the PGW requesting establishment of the dedicated VoIP bearer. The PGW may then query the PCRF to obtain policy information or directives regarding various rules to be applied for the UE, for VoIP communication. And assuming this communication between the PGW and the PCRF indicates that the VoIP communication is allowed, the PGW may then add to its bearer table an associated entry for the dedicated VoIP bearer and send a create-session response to SGW, and the SGW may send a create-session response to the MME. The MME may then responsively send an attach-accept message to the UE, notifying the UE that the dedicated VoIP bearer is established.

With the RTP session established between the UE and the IMS, and the dedicated VoIP bearer established between the UE and the PGW, the UE may then engage in the VoIP call. In particular, the UE may transmit VoIP packets (in RTP headers) over the dedicated VoIP bearer to the PGW, and the PGW may transmit those packets from the UE's IP address to the IMS. And similarly, the IMS may transmit VoIP packets to the UE's IP address, which would reach the PGW and would then flow over the dedicated VoIP bearer to the UE.

In an arrangement such as this, the issue addressed by the present disclosure may arise if the PGW and PCRF are unable to communicate with each other. More particularly, as noted above, if the UE has an existing IMS signaling bearer with the PGW and engages in SIP signaling via that bearer with the IMS to set up a VoIP call, but if the PGW is then unable to communicate adequately with the PCRF, the PGW may decline or be unable to grant a request to establish a dedicated VoIP bearer for the UE, so the UE may be unable to engage in the VoIP call.

In line with the discussion above, the network may be arranged to proactively deal with this situation, to help avoid a scenario where setup of a bearer may fail as a result of the failure of communication between the PGW and the PCRF. In particular, the network may detect when such a failure of communication between the PGW and PCRF has occurred, and the network may responsively arrange for each UE having an established bearer connection with that PGW to detach and re-attach, so as to have the UE obtain a new bearer connection instead with another PGW that may be able to communicate adequately with the PCRF.

In practice, this process can be carried out by the MME or another entity of the network, with the assistance of information provided by one or more other network entities. By way of example, each PGW may be arranged to monitor the state of its communication with the PCRF and to report to the MME when the PGW detects failure of its communication with the PCRF. Alternatively, the PCRF may monitor the state of its communication with each PGW and may report to the MME when the PCRF detects failure of its communication with a particular PGW.

Upon receiving a report of such failure of communication between the PGW and the PCRF, the MME may then refer to its records to identify each UE that currently has at least one established bearer with the PGW at issue, such as each UE that subscribes to VoIP service and currently has an established IMS signaling bearer with the PGW. The MME may then invoke a network-initiated detach process to cause the each such UE to detach with respect to at least each bearer that the UE has with that PGW, thereby releasing each such bearer between the UE and the PGW, and to cause the UE to request re-attachment. Upon receipt of a new attach message from the UE, the MME may then arrange for setup of at least one new bearer between the UE and a different PGW, optimally a PGW that is not experiencing failure of communication with the PCRF. That way, if and when it becomes necessary to set up a new bearer between the UE and the PGW, such as a dedicated VoIP bearer for instance, the PGW would optimally be able to engage in the necessary policy signaling with the PCRF to facilitate setup of that bearer.

Figure 2:
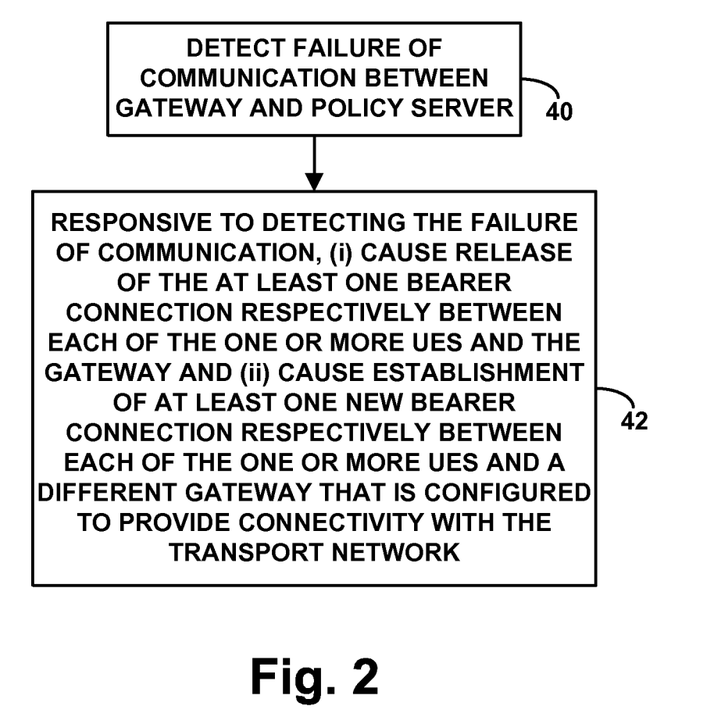
FIG. 2 is a flow chart depicting functions that can be carried out in accordance with an example method.

FIG. 2 is a flow chart illustrating functions of this process, where a gateway such as a PGW is configured to provide connectivity between UEs and a transport network, where at least one bearer connection is established respectively between each of one or more UEs and the gateway, and where the gateway is configured to communicate with a policy server such as the PCRF to obtain authorization for serving of UEs. As shown in FIG. 2, at block 40, the process involves detecting failure of communication between the gateway and the policy server. And at block 42, the process involves, responsive to detecting the failure of communication, (i) causing release of the at least one bearer connection respectively between each of the one or more UEs and the gateway and (ii) causing establishment of at least one new bearer connection respectively between each of the one or more UEs and a different gateway that is configured to provide connectivity with the transport network.

In practice, the function of detecting failure of communication between the gateway and the policy server may take various forms and may be carried out by various entities. By way of example, this function may be carried out by the gateway detecting an absence of communication between it and the policy server. For instance, the gateway and policy server may be configured to exchange heartbeat (keep-alive) messages with each other, such as to periodically send a heartbeat message and receive a heartbeat response, and the gateway may detect that has not received heartbeat responses from the policy server for a threshold period of time or that it has not received a threshold extent of heartbeat responses from the policy server. Or the gateway may detect that when the gateway sends a query or other signaling message to the policy server, the gateway does not receive a response or receives an error response indicating failure of communication. When the gateway detects such failure, the gateway may then signal to another entity such as the MME to facilitate responsive action.

As another example, this function of detecting failure of communication between the gateway and the policy server may involve receiving from the gateway a signaling message indicative of the failure. For instance, this function may be carried out by the MME. In practice, the MME may receive such a signaling message from the gateway in response to the gateway itself detecting failure of its communication with the policy server, and upon the gateway responsively generating and transmitting the signaling message to the MME. Alternatively or additionally, the MME may be arranged to periodically poll each gateway in the network to request from each gateway an indication of the current status of the gateway's communication with the policy server, and the MME may receive the signaling message in response to such a query. This signaling between the MME and a PGW in particular may flow via the SGW, making use of the existing communication interfaces between the MME and the SGW and between the SGW and the PGW, or the MME and PGW could be configured to engage in this signaling more directly with each other.

In practice with this process, the MME may be configured to keep a record of the status of each of various gateways. For example, the MME may store a listing of each gateway that has reported a communication failure with the policy server, as an indication that each such gateway should not be used for new bearer initiation. Further, if and when such a gateway regains proper communication with the policy server, the gateway may signal to the MME to indicate the absence of such failure, and the MME may then remove the gateway from the list or may update the list to indicate the absence of such failure for the gateway.

The functions of, in response to detecting the failure of communication between the gateway and the policy server, causing the release of the at least one bearer and causing establishment of at least one new bearer may then also take various forms and be carried out by various entities. By way of example, the MME may carry out these functions. For instance, for each such UE, the MME may signal to one or more core network entities such as the SGW and eNodeB to direct the release of each such bearer, and the MME may signal to the UE to direct the UE to transmit an attach request that will trigger establishment of each new bearer.

In particular, when the MME learns of the communication failure between a PGW and the PCRF, the MME may then refer to its context records to identify at least one UE that has at least one bearer connection with the PGW. For each such UE, the MME may then transmit to the UE via the serving base station a detach request that specifies a detach-type of "re-attach," to which the UE may be configured to respond at the end of the detach process by transmitting a new attach request. Further, the detach request may specify one or more bearers or service types, such as an IMS signaling bearer for instance, and the UE's re-attach request may thus similarly request attachment of the same service type, to facilitate re-establishment of a bearer for each indicated type of communication service.

Once the UE receives this detach request from the MME, the UE may then respond with a detach-accept message. In turn, the MME may then send a release command to the base station serving the UE, to direct release of the signaling connection between the base station and the MME for the UE. In particular, the MME may send a context-release command to the base station, and if the UE is in an RRC connected mode, the base station may then send an RRC connection release message to the UE to direct release of the UE's RRC connection. Upon receipt of an acknowledgement from the UE, the base station may then delete the associated context record, and the base station may transmit a context-release complete message to the MME.

Further, perhaps immediately after sending the detach request to the UE, the MME may transmit to the SGW a delete-session request specifying each bearer to be released, which may cause deactivation (e.g., deletion) of each corresponding bearer context information at the SGW for the UE. And the SGW may then transmit a delete-session response to the MME and may further transmit to the PGW a delete-session request similarly specifying each bearer to be released. The PGW may then similarly release each indicated bearer for the UE and may transmit a delete-session response to the SGW.

Optimally, the functions of causing release of one or more bearers and causing establishment of one or more new bearers may be limited to just UEs that are in the idle mode of operation. In practice, for instance, as noted above, UEs may transition between idle and connected modes of operation, and the serving base station may signal with the MME to keep the MME apprised of the UE's mode of operation. When the MME learns of the communication failure between the gateway and the policy server, the MME may then refer to its records to select as the one or more UEs whose respective bearer connection(s) will be released and with whom the respective new bearer connection(s) will be established each UE that has at least one bearer connection with the gateway at issue and that is currently in an idle mode.

Further, the MME may focus this process on UEs that have a particular type of bearer connection with the gateway at issue, and thus the MME may select UEs based on their having that particular type of bearer. For instance, to help avoid the VoIP call setup problem noted above, and/or for other reasons, the MME may select as the one or more UEs whose respective bearer connection(s) will be released and with whom the respective new bearer connection(s) will be established each UE that has an Internet Multimedia Subsystem (IMS) signaling bearer with the gateway at issue.

By including the re-attach indication in the detach request to the UE, as noted above, the MME causes the UE to request reattachment of the same type of bearer. Thus, the attachment process described above would occur again at this point. However, this time, the MME will optimally select a different gateway to serve the UE. For instance, upon querying a DNS server and obtaining a list of PGWs appropriate for serving the UE with the communication service at issue, the MME may then refer to its stored record indicating which PGW is not experiencing failure of policy server communication. Thus, the MME may select a different gateway based at least in part on there being an absence of a record indicating failure of communication between the different gateway and the policy server.

Advantageously, through this process in the VoIP example, the network would thus establish an IMS signaling bearer for the UE via the new gateway, so that the UE could then engage in VoIP call setup signaling with the IMS and could successfully have the network set up a dedicated VoIP bearer for the call via the new gateway.

Figure 3:
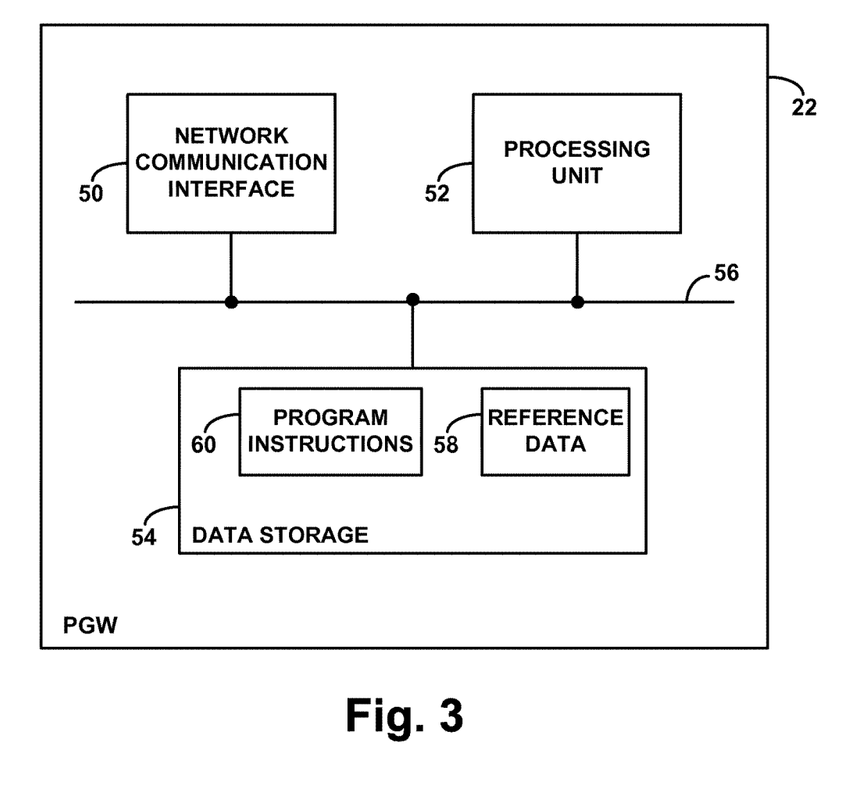
FIG. 3 is simplified block diagram of a gateway arranged to carry out various described functions.

Finally, FIG. 3 is a simplified block diagram of an example PGW, showing some of the functional components that may be included in such an entity to facilitate implementing of the present method. As shown, the example PGW includes a network communication interface 50, a processing unit 52, and non-transitory data storage 54, all of which may be integrated together in various ways and/or communicatively linked via a system bus, network, or other connection mechanism 56.

Network communication interface 50 functions to facilitate communication with various other network entities shown, such as SGW 20, PCRF 36, and other entities via transport network 24. As such, interface 50 may include one or more network interface modules, such as Ethernet network interface modules for instance or may take any of a variety of other forms, supporting wireless and/or wired communication with these and other components.

Processing unit 52 may then comprise one or more general purpose processors (such as microprocessors) and/or one or more special purpose processors (e.g., application specific integrated circuits). And data storage 54 may comprise one or more volatile and/or non-volatile storage components, such as optical, magnetic, or flash storage, and may be integrated in whole or in part with processing unit 52.

As shown, data storage 54 may hold reference data 58 and program instructions 60. The reference data 58 may from time to time include context records and policy rules for various UEs. For instance, when establishing a bearer for a UE, the PGW may obtain policy rules from the PCRF and may store those policy rules in or in addition to a context record for the UE, and the PGW may further store an indication of an IP address assigned to the UE, among possibly various other data. The program instructions 60 may then be executable by the processing unit 52 to carry out various PGW functions described herein.

Thus, by being configured with a processing unit and these program instructions, or in another manner, the PGW may be configured to communicate with a policy server such as the PCRF to obtain authorization for serving UEs, to detect communication failure between the PGW and the policy server, and to report the communication failure to the MME. Further, the PGW may be so configured to carry out other PGW functions discussed above, such as detecting the communication failure by receiving an error indication from the policy server and/or detecting a threshold absence of heartbeat messages between the PGW and the policy server.

Figure 4:
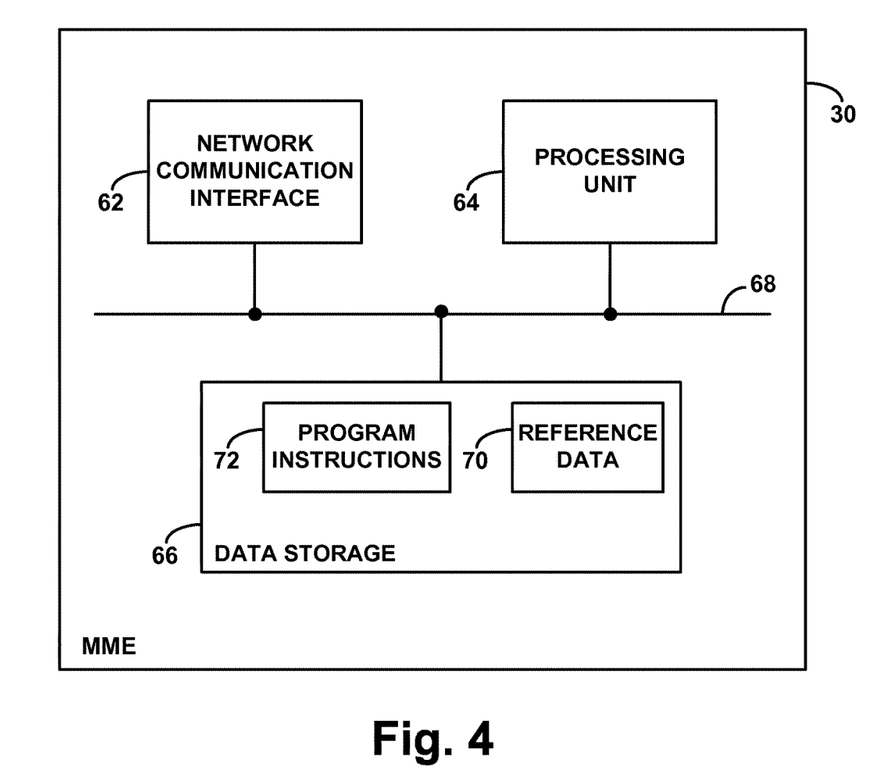
FIG. 4 is a simplified block diagram of a mobility management entity arranged to carry out various described functions.

Finally, FIG. 4 is a simplified block diagram of an example MME, showing some of the functional components that may be included in such an entity to facilitate implementing of the present method. As shown, the example MME includes a network communication interface 62, a processing unit 64, and non-transitory data storage 66, all of which may be communicatively linked together by a system bus, network, or other connection mechanism 68.

Network communication interface 62 functions to facilitate communication with various other network entities shown, such as base station(s) 12, SGW 20, HSS 32, and DNS server 34. As such, the interface 62 may include one or more network interface modules, such as Ethernet network interface modules for instance or may take any of a variety of other forms, supporting wireless and/or wired communication with these and other components.

Processing unit 64 may then comprise one or more general purpose processors (such as microprocessors) and/or one or more special purpose processors (e.g., application specific integrated circuits). And data storage 66 may comprise one or more volatile and/or non-volatile storage components, such as optical, magnetic, or flash storage, and may be integrated in whole or in part with processing unit 64.

As shown, data storage 66 may hold reference data 70 and program instructions 72. The reference data 70 may from time to time include context records and other data for various UEs. For instance, the data may specify for each of various served UEs each bearer currently established for the UE, which PGW is serving the bearer, and the RRC connection status of the UE, among possibly various other data. The program instructions 60 may then be executable by the processing unit 52 to carry out various MME functions described herein.

Thus, by being configured with a processing unit and these program instructions, or in another manner, the MME may be configured to respond to a report from a given PGW of communication failure between the PGW and a policy server by carrying out functions including at least (i) identifying one or more UEs each having at least one bearer connection with the given PGW, (ii) causing the at least one bearer connection of each identified UE to be released and (iii) causing establishment for each identified UE of at least one new bearer connection with a different one of the PGWs. Further, the MME may be so configured to carry out other MME functions discussed above, such as identifying the one or more UEs based at least on each of the one or more UEs being in an idle mode of operation and/or the at least one bearer connection of each of the one or more UEs being of a particular type, such as an IMS signaling bearer, and such as selecting the different PGW based at least on an absence of indication that the different PGW is not experiencing communication failure with the policy server.

Exemplary embodiments have been described above. Those skilled in the art will understand, however, that changes and modifications may be made to these embodiments without departing from the true scope and spirit of the invention.

What is claimed is:

1. A method operable in a communication system, wherein the communication system includes a gateway configured to provide connectivity between user equipment devices (UEs) and a transport network, and wherein the gateway is configured to communicate with a policy server to obtain authorization for serving of UEs, the method comprising:
    detecting failure of communication between the gateway and the policy server; and
    responsive to detecting the failure of communication, (i) selecting one or more UEs based on each of the selected one or more UEs having at least an Internet Multimedia System (IMS) signaling bearer connection with the gateway, (ii) causing release of at least each selected UE's IMS signaling bearer connection with the gateway and (ii) causing establishment of at least one new bearer connection respectively between each of the one or more UEs and a different gateway that is configured to provide connectivity with the transport network.

2. The method of claim 1, wherein each of the one or more UEs is served by an eNodeB, and wherein each UE's IMS signaling bearer connection includes a radio bearer between the UE and the eNodeB and an access bearer between the eNodeB and the gateway.

3. The method of claim 1, wherein detecting the failure of communication between the gateway and the policy server comprises receiving from the gateway a signaling message indicative of the failure.

4. The method of claim 1, further comprising:
    selecting the one or more UEs is further based at least on the one or more UEs each being currently in an idle mode of operation.

5. The method of claim 1, wherein, for each selected UE, causing the release of the UE's IMS signaling bearer connection and causing establishment of the at least one new bearer connection with the UE comprises:
    signaling to at least one core network entity to direct release of the at least one bearer connection with the UE; and
    signaling to the UE to direct the UE to transmit an attach request that will trigger establishment of the at least one new bearer connection with the UE.

6. The method of claim 5, wherein the communication system includes a mobility management entity (MME), and wherein the detecting and causing are carried out by the MME.

7. The method of claim 1, further comprising selecting the different gateway based at least on an absence of a record indicating failure of communication between the different gateway and the policy server.

8. The method of claim 1, wherein the policy server is a policy and charging rules function (PCRF).

9. A wireless communication system comprising:
    a plurality of packet data network gateways (PGWs) configured to provide user equipment devices (UEs) with connectivity to a packet-switched network, and
    a mobility management entity (MME) configured to manage setup and release of bearer connections between the UEs and the PGWs,
    wherein each PGW is configured to communicate with a policy server to obtain authorization for serving of UEs, and each PGW is further configured to detect communication failure between the PGW and the policy server and to report the communication failure to the MME, and
    wherein the MME is configured to respond to a report of the communication failure from a given one of the PGWs at least in part by (i) identifying one or more UEs each having at least one bearer connection with the given PGW, wherein the identifying of the one or more UEs is based at least on the at least one bearer connection of each of the one or more UEs including an Internet Multimedia System (IMS) signaling bearer, (ii) causing the at least one bearer connection of each identified UE to be released and (iii) causing establishment for each identified UE of at least one new bearer connection with a different one of the PGWs.

10. The wireless communication system of claim 9, wherein the MME is configured to select the different PGW based at least on an absence of indication that the different PGW is not experiencing communication failure with the policy server.

11. The wireless communication system of claim 9, wherein the identifying of the one or more UEs is further based at least on each of the one or more UEs being in an idle mode of operation.

12. The wireless communication system of claim 9, wherein detecting the communication failure comprises a function selected from the group consisting of (i) receiving an error indication from the policy server and (ii) detecting a threshold absence of heartbeat messages between the PGW and the policy server.

13. A mobility management entity comprising:
a network communication interface;
a processing unit;
data storage; and
program instructions stored in the data storage and executable by the processing unit to carry out functions comprising:
determining that a first gateway that has bearer connections with user equipment devices (UEs) and that provides the UEs with connectivity to a packet-switched network has experienced failure of communication with a policy server, and
responsive to the determining, (i) selecting at least one of the UEs based on the first gateway having an Internet Multimedia Subsystem (IMS) signaling bearer connection with each of the selected at least one UE, and (ii) for each selected UE, signaling via the network communication interface to direct release of at least the IMS signaling bearer connection with the UE and to cause establishment of at least one new bearer connection between the UE and a second gateway instead of the first gateway.

14. The mobility management entity of claim 13, wherein, for each selected UE, signaling to cause establishment of the at least one new bearer connection between the UE and the second gateway comprises transmitting to the UE a detach message that carries a directive for the UE to send an attach request, wherein the attach request triggers establishment of the at least one new bearer connection.

15. The mobility management entity of claim 13, wherein the selecting is further based on each selected UE being in an idle mode of operation.

16. The mobility management entity of claim 13, wherein the functions further comprise selecting the second gateway based at least on an absence of indication that the second gateway is experiencing communication failure with the policy server.

17. The mobility management entity of claim 13, wherein each bearer connection comprises a radio bearer between the UE and an eNodeB serving the UE and an access bearer between the eNodeB and the gateway.

\* \* \* \* \*